United States Patent
Von Koch et al.

(10) Patent No.: US 8,768,881 B2
(45) Date of Patent: **\*Jul. 1, 2014**

(54) RSS DATA-PROCESSING OBJECT

(75) Inventors: Walter V. Von Koch, Seattle, WA (US);
Sean O. Lyndersay, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,595

(22) Filed: Aug. 1, 2012

(65) Prior Publication Data

US 2012/0297290 A1   Nov. 22, 2012

Related U.S. Application Data

(63) Continuation of application No. 11/276,536, filed on Mar. 3, 2006, now Pat. No. 8,280,843.

(51) Int. Cl.
*G06F 17/30* (2006.01)

(52) U.S. Cl.
USPC ............................................. 707/607

(58) Field of Classification Search
None
See application file for complete search history.

(56) References Cited

U.S. PATENT DOCUMENTS

| | | | |
|---|---|---|---|
| 5,404,488 A | 4/1995 | Kerrigan et al. |
| 5,649,186 A | 7/1997 | Ferguson |
| 5,819,034 A | 10/1998 | Joseph et al. |
| 5,819,284 A | 10/1998 | Farber et al. |
| 5,926,796 A | 7/1999 | Walker et al. |
| 5,960,411 A | 9/1999 | Hartman et al. |
| 5,963,964 A | 10/1999 | Nielsen |
| 5,974,549 A | 10/1999 | Golan |
| 6,035,336 A | 3/2000 | Lu et al. |
| 6,057,834 A | 5/2000 | Pickover |
| 6,057,837 A | 5/2000 | Hatakeda et al. |
| 6,078,924 A | 6/2000 | Ainsbury et al. |
| 6,085,186 A | 7/2000 | Christianson et al. |
| 6,101,510 A | 8/2000 | Stone |
| 6,243,757 B1 | 6/2001 | Kanodia et al. |
| 6,282,546 B1 | 8/2001 | Gleichauf et al. |
| 6,334,145 B1 | 12/2001 | Adams et al. |
| 6,366,912 B1 | 4/2002 | Wallent et al. |
| 6,594,692 B1 | 7/2003 | Reisman |
| 6,613,098 B1 | 9/2003 | Sorge et al. |
| 6,694,431 B1 | 2/2004 | Binding et al. |

(Continued)

FOREIGN PATENT DOCUMENTS

| | | |
|---|---|---|
| CA | 2496672 | 2/2004 |
| CN | 1536483 | 10/2004 |

(Continued)

OTHER PUBLICATIONS

"Foreign Office Action", Japanese Application No. 2008-558294, (Aug. 7, 2012), 4 pages.

(Continued)

*Primary Examiner* — Bai D. Vu
(74) *Attorney, Agent, or Firm* — Andrew Sanders; Micky Minhas; Wolfe-SBMC (57) ABSTRACT

Various embodiments utilize a special object referred to as an rsshttp object to acquire an RSS feed, process the feed and expose an object model to a web page or application. In at least some embodiments, the rsshttp object can parse through the feed's associated RSS data, normalize the feed data to a standard format, sanitize the feed data if necessary, and then present a standardized object model for interaction with web pages and applications.

20 Claims, 8 Drawing Sheets

(56) References Cited

U.S. PATENT DOCUMENTS

| | | |
|---|---|---|
| 6,708,172 B1 | 3/2004 | Wong et al. |
| 6,732,102 B1 | 5/2004 | Khandekar et al. |
| 6,775,772 B1 | 8/2004 | Binding et al. |
| 6,779,154 B1 | 8/2004 | Nussbaum et al. |
| 6,874,084 B1 | 3/2005 | Dobner et al. |
| 6,917,937 B1 | 7/2005 | Rubendall |
| 6,941,521 B2 | 9/2005 | Lin et al. |
| 7,010,580 B1 | 3/2006 | Fu et al. |
| 7,047,488 B2 | 5/2006 | Ingersoll et al. |
| 7,089,248 B1 | 8/2006 | King et al. |
| 7,092,992 B1 | 8/2006 | Yu |
| 7,103,600 B2 | 9/2006 | Mullins |
| 7,213,204 B1 | 5/2007 | Dutta |
| 7,451,392 B1 | 11/2008 | Chalecki et al. |
| 7,516,399 B2 | 4/2009 | Hsu et al. |
| 7,529,766 B2 | 5/2009 | Shilo et al. |
| 7,739,602 B2 | 6/2010 | Feng et al. |
| 7,865,511 B2 | 1/2011 | Kahn et al. |
| 7,979,803 B2 | 7/2011 | Kim et al. |
| 8,200,775 B2 | 6/2012 | Moore |
| 8,280,843 B2 | 10/2012 | von Koch et al. |
| 8,661,459 B2 | 2/2014 | Gandhi et al. |
| 2001/0027472 A1 | 10/2001 | Guan |
| 2001/0050658 A1 | 12/2001 | Adams |
| 2001/0051907 A1 | 12/2001 | Kumar et al. |
| 2001/0056460 A1 | 12/2001 | Sahota et al. |
| 2002/0002571 A1 | 1/2002 | Manohar et al. |
| 2002/0010700 A1 | 1/2002 | Wotring |
| 2002/0019812 A1 | 2/2002 | Board et al. |
| 2002/0026462 A1 | 2/2002 | Shotton et al. |
| 2002/0035617 A1 | 3/2002 | Lynch et al. |
| 2002/0072951 A1 | 6/2002 | Lee et al. |
| 2002/0108115 A1 | 8/2002 | Palmer |
| 2002/0116630 A1 | 8/2002 | Stehlin |
| 2002/0124074 A1 | 9/2002 | Levy et al. |
| 2002/0124172 A1 | 9/2002 | Manahan |
| 2002/0147746 A1 | 10/2002 | Lee |
| 2002/0156905 A1 | 10/2002 | Weissman |
| 2002/0174201 A1 | 11/2002 | Ramer et al. |
| 2002/0184491 A1 | 12/2002 | Morgan et al. |
| 2003/0014406 A1 | 1/2003 | Faieta et al. |
| 2003/0028762 A1 | 2/2003 | Trilli et al. |
| 2003/0033179 A1 | 2/2003 | Katz et al. |
| 2003/0033606 A1 | 2/2003 | Puente et al. |
| 2003/0120671 A1 | 6/2003 | Kim et al. |
| 2003/0135504 A1 | 7/2003 | Elvanoglu et al. |
| 2003/0135553 A1 | 7/2003 | Pendakur |
| 2003/0149737 A1 | 8/2003 | Lambert et al. |
| 2003/0220930 A1 | 11/2003 | Milleker et al. |
| 2003/0229716 A1 | 12/2003 | Holland |
| 2004/0024720 A1 | 2/2004 | Fairweather |
| 2004/0031052 A1 | 2/2004 | Wannamaker et al. |
| 2004/0044961 A1 | 3/2004 | Pesenson |
| 2004/0073924 A1 | 4/2004 | Pendakur |
| 2004/0093296 A1 | 5/2004 | Phelan et al. |
| 2004/0117439 A1 | 6/2004 | Levett et al. |
| 2004/0143683 A1 | 7/2004 | Greenwood |
| 2004/0181753 A1 | 9/2004 | Michaelides |
| 2004/0225749 A1 | 11/2004 | Pavlik et al. |
| 2004/0230676 A1 | 11/2004 | Spivack et al. |
| 2004/0237120 A1 | 11/2004 | Lewin et al. |
| 2004/0250115 A1 | 12/2004 | Gemmel et al. |
| 2005/0010595 A1 | 1/2005 | Brown et al. |
| 2005/0027676 A1 | 2/2005 | Eichstaedt et al. |
| 2005/0033657 A1 | 2/2005 | Herrington et al. |
| 2005/0038717 A1 | 2/2005 | McQueen, II et al. |
| 2005/0039144 A1 | 2/2005 | Wada et al. |
| 2005/0060647 A1 | 3/2005 | Doan et al. |
| 2005/0091220 A1 | 4/2005 | Klemow |
| 2005/0097180 A1 | 5/2005 | Abdelhak |
| 2005/0108227 A1 | 5/2005 | Russell-Falla et al. |
| 2005/0108262 A1 | 5/2005 | Fawcett, Jr. et al. |
| 2005/0108633 A1 | 5/2005 | Sahota et al. |
| 2005/0114757 A1 | 5/2005 | Sahota et al. |
| 2005/0119910 A1 | 6/2005 | Schneider |
| 2005/0154978 A1 | 7/2005 | Albornoz et al. |
| 2005/0165615 A1 | 7/2005 | Minar |
| 2005/0182645 A1 | 8/2005 | Ehlis et al. |
| 2005/0188078 A1 | 8/2005 | Kotzin et al. |
| 2005/0216439 A1 | 9/2005 | Kawakita |
| 2005/0216452 A1 | 9/2005 | Teague |
| 2005/0216837 A1 | 9/2005 | Washburn |
| 2005/0228887 A1 | 10/2005 | Wang et al. |
| 2005/0268100 A1 | 12/2005 | Gasparini et al. |
| 2005/0289147 A1 | 12/2005 | Kahn et al. |
| 2005/0289468 A1 | 12/2005 | Kahn et al. |
| 2006/0004703 A1 | 1/2006 | Spivack et al. |
| 2006/0041593 A1 | 2/2006 | Borthakur et al. |
| 2006/0053293 A1 | 3/2006 | Zager et al. |
| 2006/0095507 A1 | 5/2006 | Watson |
| 2006/0095860 A1 | 5/2006 | Wada et al. |
| 2006/0129917 A1 | 6/2006 | Volk et al. |
| 2006/0161845 A1 | 7/2006 | Kahn et al. |
| 2006/0173865 A1 | 8/2006 | Fong |
| 2006/0173985 A1 | 8/2006 | Moore |
| 2006/0179060 A1 | 8/2006 | Shilo et al. |
| 2006/0184617 A1 | 8/2006 | Nicholas et al. |
| 2006/0200443 A1 | 9/2006 | Kahn et al. |
| 2006/0200740 A1 | 9/2006 | Kahn et al. |
| 2006/0206803 A1 | 9/2006 | Smith |
| 2006/0213976 A1 | 9/2006 | Inakoshi et al. |
| 2006/0213979 A1 | 9/2006 | Geller et al. |
| 2006/0218403 A1 | 9/2006 | Sauve et al. |
| 2006/0230021 A1 | 10/2006 | Diab et al. |
| 2006/0230071 A1 | 10/2006 | Kass et al. |
| 2006/0242663 A1 | 10/2006 | Gogerty |
| 2006/0253459 A1 | 11/2006 | Kahn et al. |
| 2006/0253489 A1 | 11/2006 | Kahn et al. |
| 2006/0265518 A1 | 11/2006 | Owens et al. |
| 2006/0288011 A1 | 12/2006 | Gandhi et al. |
| 2006/0288329 A1 | 12/2006 | Gandhi et al. |
| 2007/0011156 A1 | 1/2007 | Maron |
| 2007/0011665 A1 | 1/2007 | Gandhi et al. |
| 2007/0022174 A1 | 1/2007 | Issa |
| 2007/0033290 A1 | 2/2007 | Valen et al. |
| 2007/0050446 A1 | 3/2007 | Moore |
| 2007/0079321 A1 | 4/2007 | Ott, IV |
| 2007/0100836 A1 | 5/2007 | Eichstaedt et al. |
| 2007/0101313 A1 | 5/2007 | Bodin et al. |
| 2007/0208759 A1 | 9/2007 | von Koch et al. |
| 2007/0245251 A1 | 10/2007 | Kim |
| 2008/0195483 A1 | 8/2008 | Moora |
| 2009/0013266 A1 | 1/2009 | Gandhi |
| 2009/0019063 A1 | 1/2009 | Gandhi |
| 2014/0115109 A1 | 4/2014 | Gandhi et al. |

FOREIGN PATENT DOCUMENTS

| | | |
|---|---|---|
| CN | 1124673 | 7/2009 |
| EP | 1997023 | 12/2008 |
| JP | 6180698 | 6/1994 |
| JP | 2008547117 | 12/2008 |
| KR | 102003004225 | 5/2003 |
| WO | WO-0126018 | 4/2001 |
| WO | WO-0144934 | 6/2001 |
| WO | WO-0182139 | 11/2001 |
| WO | WO-0207013 | 1/2002 |
| WO | WO-2004107216 | 12/2004 |
| WO | WO-2005027402 | 3/2005 |
| WO | WO-2005089336 | 9/2005 |
| WO | WO-2007001882 | 1/2007 |

OTHER PUBLICATIONS

"International Search Report and Written Opinion", Application No. PCT/US2007/003722, (Jul. 24, 2007), 7 pages.
"Non-Final Office Action", U.S. Appl. No. 11/158,911, (Sep. 7, 2012), 11 pages.
"Non-Final Office Action", U.S. Appl. No. 12/234,449, (Oct. 4, 2012), 9 pages.
"Final Office Action", U.S. Appl. No. 11/158,936, (Feb. 26, 2013), 20 pages.
"Foreign Office Action", Chinese Application No. 200780007512.9, (Dec. 3, 2012), 11 pages.

(56) References Cited

OTHER PUBLICATIONS

"Foreign Office Action", Korean Application No. Oct. 2007-7028432, (Jan. 30, 2013), 6 pages.
"Foreign Office Action", Korean Application No. 10-2007-7029137, (Dec. 27, 2012), 6 pages.
"Advisory Action", U.S. Appl. No. 11/158,398, (Jan. 26, 2011), 3 pages.
"Advisory Action", U.S. Appl. No. 11/276,584, (Apr. 17, 2009),3 pages.
"Attensa Outlook—Getting Started", www.attensa.com, (2005),pp. 1-33.
"Blogdigger—Add Feed Form", *Internet Resource*, Retrieved from <http://web.archive.org/web/20050618015745/http://www.blogdigger.com/add.jsp> on Nov. 13, 2008 1 of> on Nov. 13, 2008,1 page.
"Bradbury Software FeedDemon 1.0", (May 26, 2004),3 pages.
"Decision on Reexamination", Chinese Application No. 200680021415.0, (Jan. 16, 2012),2 pages.
"Decision on Rejection", Chinese Application No. 200680021415.0, (Sep. 2, 2011),12 pages.
"EP Search Report", Application No. 07751586.4, (Aug. 13, 2009),9 pages.
"EP Search Report", Application Serial No. 07750552.7, EESR,(Sep. 30, 2009),6 pages.
"Extended European Search Report", EP Application No. 06773165.3, (Jan. 24, 2011),12 pages.
"Feed Splicing, Part 1", Retrieved from: <http://blogs.feedburner.com/feedburner/archives/2004/07/feed_splicing_part_i.php> on Jul. 14, 2004, 5 pages.
"Feed Splicing, Part 2", Retrieved from <http://blods.feedburner.com/feedburner/archives/2004/08feed_splicing_part_ii.php> on Dec. 8, 2008, (Aug. 16, 2004),5 pages.
"FeedBurner", Retrieved from <http://www.feedburner.com> on Dec. 8, 2008, (Feb. 25, 2004),1 Page.
"Final Office Action", U.S. Appl. No. 11/158,398, (Oct. 15, 2010),11 pages.
"Final Office Action", U.S. Appl. No. 11/158,398, (Feb. 25, 2009),12 pages.
"Final Office Action", U.S. Appl. No. 11/158,398, (Mar. 22, 2010),11 pages.
"Final Office Action", U.S. Appl. No. 11/158,398, (May 24, 2012),12 pages.
"Final Office Action", U.S. Appl. No. 11/158,911, (Oct. 15, 2010),13 pages.
"Final Office Action", U.S. Appl. No. 11/158,911, (Oct. 28, 2009),10 pages.
"Final Office Action", U.S. Appl. No. 11/158,936, (Jun. 26, 2009),16 pages.
"Final Office Action", U.S. Appl. No. 11/158,936, (Jul. 19, 2010),14 pages.
"Final Office Action", U.S. Appl. No. 11/276,536, (Nov. 9, 2011),16 pages.
"Final Office Action", U.S. Appl. No. 11/276,536, (Mar. 4, 2011),17 pages.
"Final Office Action", U.S. Appl. No. 11/276,536, (Apr. 23, 2010),20 pages.
"Final Office Action", U.S. Appl. No. 11/276,536, (Jun. 20, 2008),28 pages.
"Final Office Action", U.S. Appl. No. 11/276,584, (Oct. 29, 2009),12 pages.
"Final Office Action", U.S. Appl. No. 11/276,584, (Dec. 23, 2010),4 pages.
"Final Office Action", U.S. Appl. No. 12/234,403, (Oct. 4, 2011),18 pages.
"Final Office Action", U.S. Appl. No. 12/234,449, (Mar. 25, 2011),11 pages.
"Final Rejection", Chinese Application No. 200680021415.0, (Sep. 2, 2011),7 Pages.
"First Office Action", Chinese Application No. 200780007512.9, (Jan. 15, 2010),7 pages.
"First Office Action", Chinese Application No. 200780008302.1, (Jan. 8, 2010),15 pages.
"flaggeditems.png", *Print screen from Internet Search*, Retreived from <http://web.archive.org/web/20050623095655/http://ranchero.com/images/nnw2/flaggeditems.png> on Nov. 13, 2008,1 page.
"Foreign Office Action", Application Serial No. 07750552.7, (Nov. 17, 2009),6 pages.
"Foreign Office Action", Application Serial No. 200680018421.0, (Jan. 9, 2009),10 pages.
"Foreign Office Action", Australian Application No. 2006262540, (Oct. 8, 2010),1 page.
"Foreign Office Action", Chinese Application No. 200680018421.0, (Jun. 24, 2010),11 pages.
"Foreign Office Action", Chinese Application No. 200680018421.0, (Sep. 3, 2010),9 pages.
"Foreign Office Action", Chinese Application No. 200680021415.0, (Jun. 8, 2010),10 pages.
"Foreign Office Action", Chinese Application No. 200680021415.0, (Mar. 14, 2011),10 pages.
"Foreign Office Action", Chinese Application No. 200680021415.0, (Mar. 14, 2012),9 pages.
"Foreign Office Action", Chinese Application No. 200680021415.0, (Jun. 29, 2012),6 pages.
"Foreign Office Action", Chinese Application No. 200780007512.9, (May 25, 2011),9 pages.
"Foreign Office Action", Chinese Application No. 200780007512.9, (Sep. 26, 2011),10 pages.
"Foreign Office Action", Chinese Application No. 200780007512.9, (May 14, 2012),7 pages.
"Foreign Office Action", Chinese Application No. 200780008302.1, (Dec. 16, 2010),12 pages.
"Foreign Office Action", Chinese Application No. 200780008302.1, (Sep. 15, 2011),9 pages.
"Foreign Office Action", Chinese Application No. 200780008302.1, (Dec. 6, 2011),7 pages.
"Foreign Office Action", Japanese Application No. 2008-518243, (Oct. 20, 2011),6 pages.
"Foreign Office Action", Japanese Application No. 2008-558275, (Feb. 28, 2012),5 pages.
"Foreign Office Action", Japanese Application No. 2008-558294, (Oct. 19, 2011),5 pages.
"Foreign Office Action", Japanese Application No. 2008-558294, (Apr. 13, 2012),5 pages.
"Foreign Office Action", Korean Application No. 10-2007-7029137, (May 24, 2012),7 pages.
"Foreign Office Action", Mexican Application No. MX/a/2008/01105, (Jun. 2, 2012),12 pages.
"Foreign Office Action", Mexican Application No. MX/a/2008/11058, (Jul. 6, 2011),6 pages.
"Front Line of RSS Media Business; The Third Internet Media Following E-mail and Web", *Redcruise, Inc.*, Internet Magazine, Japan, Impress, Inc., No. 127,(Aug. 1, 2005),32 pages.
"Google Reader: beta feed reader", Retrieved from <http://www.consumingexperience.com/2005/10/google-reader-beta-feed-reader.html,(Oct. 7, 2005),8 pages.
"Google Reader: Reviewers Guide", Available at: <http://www.google.com/press/guides/reader_overview.pdf>, (Oct. 16, 2005),pp. 1-5.
"Introduction to RSS", Retrieved from: <http://www.webreference.com/authoring/languages/xml/rss/intro.> on Jan. 28, 2008, (Mar. 27, 2000),3 Pages.
"Java.net: The Source for Java Technology Collaboration: rome", retrieved from <https://rome.dev.java.net/> on Jan. 17, 2006, 2 pages.
"JP Notice of Publication", Application Serial No. 2008-558275, (Aug. 6, 2009),2 pages.
"JP Notice of Publication", Application Serial No. 2008-558294, (Aug. 13, 2009),2 pages.
"Kalsey_Blogfeed", Internet Article, Retrieved from <http://web.archive.org/web/20050515005125/http://www.kalsey.com/tools/blogfeed/> on Nov. 13, 2008,pp. 1-3.

(56) References Cited

OTHER PUBLICATIONS

"mainWindow2.png", *Print Screen from Internet Article*, Retrieved from <http://web.archive.org/web/20050623095300/http://ranchero.com/images/nnw2/mainWindow2.png> on Nov. 13, 2008,1 page.
"NetNewsWire_helpbook_faq", *Internet Search FAQ sheet*, Retrieved from <http://web.archive.org/web/20050623234918/http://ranchero.com/netnewswire/helpBook/faq.html> on Nov. 13, 2008,pp. 1-3.
"Non Final Office Action", U.S. Appl. No. 11/158,911, (Jun. 30, 2009),9 pages.
"Non Final Office Action", U.S. Appl. No. 11/276,536, (Jan. 9, 2009),33 pages.
"Non Final Office Action", U.S. Appl. No. 11/276,536, (May 28, 2009),18 pages.
"Non Final Office Action", U.S. Appl. No. 11/276,584, (Jun. 25, 2009),11 pages.
"Non-Final Office Action", U.S. Appl. No. 11/158,398, (Sep. 8, 2009),9 pages.
"Non-Final Office Action", U.S. Appl. No. 11/158,398, (Nov. 28, 2011),15 pages.
"Non-Final Office Action", U.S. Appl. No. 11/158,398, (May 13, 2010),10 pages.
"Non-Final Office Action", U.S. Appl. No. 11/158,398, (May 14, 2008),9 Pages.
"Non-Final Office Action", U.S. Appl. No. 11/158,911, (Feb. 21, 2012),10 pages.
"Non-Final Office Action", U.S. Appl. No. 11/158,911, (Jun. 10, 2010),11 pages.
"Non-Final Office Action", U.S. Appl. No. 11/158,936, (Jan. 12, 2010),12 pages.
"Non-Final Office Action", U.S. Appl. No. 11/158,936, (Aug. 16, 2012),18 pages.
"Non-Final Office Action", U.S. Appl. No. 11/276,536, (Oct. 7, 2009),15 pages.
"Non-Final Office Action", U.S. Appl. No. 11/276,536, (Dec. 26, 2007),24 pages.
"Non-Final Office Action", U.S. Appl. No. 11/276,536, (Jun. 23, 2011),14 pages.
"Non-Final Office Action", U.S. Appl. No. 11/276,536, (Sep. 15, 2010),13 pages.
"Non-Final Office Action", U.S. Appl. No. No. 11/276,584, (Dec. 28, 2009),12 pages.
"Non-Final Office Action", U.S. Appl. No. 11/276,584, (Jul. 26, 2010),14 pages.
"Non-Final Office Action", U.S. Appl. No. 12/234,403, (Apr. 1, 2011),10 pages.
"Non-Final Office Action", U.S. Appl. No. 12/234,449, (Oct. 27, 2010),8 pages.
"Non-Final Office Action", U.S. Appl. No. 12/234,449, (Jun. 1, 2010),8 pages.
"Notice of Acceptance", Australian Application No. 2006262540, (Dec. 22, 2010),2 pages.
"Notice of Allowance", U.S. Appl. No. 11/276,536, (May 25, 2012),11 pages.
"Notice of Allowance", U.S. Appl. No. 11/276,584, (Mar. 7, 2011),6 pages.
"PCT Search Report and Written Opinion", Application No. PCT/US06/23336, (Oct. 29, 2007),8 pages.
"Persistence.png", *Print Screen from Internet Article*, Retrieved from <http://web.archive.org/web/20050623095937/http://ranchero.com/images/nnw2/persistence.png> on Nov. 13, 2008,1 page.
"Protecting Commercial Secure Web Servers from Key-Finding Threats", *nCipher, Inc.*, Available at <www.ncipher.com/uploads/resources/pcws.pdf>,(1999),12 pages.
"Ranchero Software_Editing LiveJournal Logs", *Internet Article*, Retrieved from <http://web.archive.org/web/20051217022724/http://ranchero.com/netnewswire/tips/livejournalconfig.php> on Nov. 13, 2008,pp. 1-3.
"Ranchero Software_NetNewsWfaq", *Internet Search Engine FAQ sheet*, Retrieved from <http://web.archive.org/web/20030201120948/http://ranchero.com/netnewswire/faq.php> on Nov. 13, 2008,pp. 1-4.
"Ranchero Software_NetNewsWire 2.0 Change Notes", *Internet Article*, Retrieved from <http://web.archive.org/web/20051024203943/http://ranchero.com/netnewswire/changenotes/netnewswire20.php> on Nov. 13, 2008,3 pages.
"Ranchero Software_Smart Lists", *Internet Article*, Retrieved from <http://web.archive.org/web/20050602084724/http://ranchero.com/netnewswire/features/smartLists.php> on Nov. 13, 2008,pp. 1-2.
"Ranchero Software Subscription Sharing", *Internet Article*, Retrieved from <http://web.archive.org/web/20050811083741/http://ranchero.com/netnewswire/features/sharing.php> on Nov. 13, 2008,pp. 1-3.
"Ranchero Software Search Engine Subscriptions", *On-line Article*, Retrieved from <http://web.archive.org/web/20050714082710/http://ranchero.com/netnewswire/f eatures/searchEngineSubscriptions.php> on Nov. 13, 2008,pp. 1-2.
"Ranchero Software: NetNewsWire", *Internet Article*, Retrieved from <http://web.archive.org/web/20051003204517/ranchero.com/netnewswire/> on Nov. 13, 2008,(2005),5 pages.
"Ranchero Software: What's New in NetNewsWire 2.0", *Web article*, retrieved from <http://web.archive.org/web/20050618014501/http://ranchero.com/netnewswire/whatsnew/netnewswire20.php> on Nov. 13, 2008,pp. 1-3.
"Ranchero Software_Flagged Items", *Internet Article*, Retrieved from <http://web.archive.org/web/20050612083011/http://ranchero.com/netnewswire/f eatures/flaggedItems.php> on Nov. 13, 2008,1 page.
"Rancho Software_Features Chart", *Internet Article*, Retrieved from <http://web.archive.org/web/20050609010027/http://ranchero.com/netnewswire/featureschart20.php> on Nov. 13, 2008,pp. 1-3.
"RSS 2.0 Specification", (Jul. 15, 2003),8 pages.
"RSS Submissions", *Internet Article*, Retrieved from <http://web.archive.org/web/20050619014308/http://www.rss-specifications.com/rss-submission.htm> on Nov. 13, 2008,pp. 1-3.
"Search Engine Subscriptions", *Internet Article*, Retrieved from <http://web.archive.org/web/20051217013212/http://ranchero.com/netnewswire/helpBook/searchEngineSubs.html> on Nov. 13, 2008,1 page.
"SearchFeed.png", *Print Screen in article*, Retrieved from <http://web.archive.org/web/20050623095831/http://ranchero.com/images/nnw2/searchFeed.png> on Nov. 13, 2008,1 page.
"Searching.png", *Print Screen from article*, Retrieved from <http://web.archive.org/web/20050623095422/http://ranchero.com/images/nnw2/searching.png> on Nov. 13, 2008,1 page.
"smartList.png", *Print Screen from Internet Article*, Retrieved from <http://web.archive.org/web/20050623095628/http://ranchero.com/images/nnw2/smartList.png> on Nov. 13, 2008,1 page.
"Subscribing and Unsubscribing", *Internet Article*, Retrieved from <http://web.archive.org/web/20060915152527/http://ranchero.com/netnewswire/helpBook/subUnsub.html> on Nov. 13, 2008,pp. 1-2.
"Syncing", *Internet Article*, Retrieved from <http://web.archive.org/web/20051217023557/http://ranchero.com/netnewswire/helpBook/syncing.html> on Nov. 13, 2008,1 page.
"syncing.png", *Print Screen from article*, retrieved from <http://web.archive.org/web/20050623095327/http://ranchero.com/images/nnw2/syncing.png> on Nov. 13, 2008,2 pages.
"Syndic8.com—Documents1", Internet Article, Retrieved from <http://web.archive.org/web/20050513214756/http://www.syndic8.com/documents/howto/> on Nov. 13, 2008,pp. 1-3.
"Syndic8.com—Documents2", *Internet Article*, Retrieved from <http://web.archive.org/web/20050622035505/http://www.syndic8.com/documents/howto/> on Nov. 13, 2008,pp. 1-3.
"Syndic8.com—HowToUse", *Internet Article*, Retrieved from <http://web.archive.org/web/20050619233841/http://www.syndic8.com/howto.php> on Nov. 13, 2008,pp. 1-4.
"The Feed Thickens", Retrieved from: <http://blog.flickr.net/en/2004/07/14/the-feed-thickens/>, (Jul. 14, 2004),2 pages.
"Yahoo! Publishers Guide to RSS : Submit your RSS Feed", Internet Article, Retrieved from <http://web.archive.org/web/

(56) References Cited

OTHER PUBLICATIONS

20051216153612/http://uk.promotions.yahoo.com/publisher/submit.html> on Nov. 13, 2008,pp. 1-3.
"Yahoo! Search Services and Tools", Internet Search Screen, Retrieved from <http://web.archive.org/web/20051001065344/http://search.yahoo.com/mrss/sub mit> on Nov. 13, 2008,1 page.
Anonymous, "The Evolution of RSS", (Online); XP002546010; Internet; Retrieved from the Internet: URL:http://web.archive.org/web/20041011055544/http://www.webreference.com/ authoring/languages/xml/rss/1/7.html *the whole document*,(Oct. 11, 2004),1 page.
Attardi, G et al., "The LOA Customizable Media Aggregator", *Automated Production of Cross Media Content for Multi-Channel Distribution*, 2005. Axmedis 2005. First International Conference on Florence, Italy 30-02 Nov. 2005, Piscataway, NJ, USA, IEEE, Nov. 30, 2005. XP010892440 ISBN: 978-0-7695-2348-4, (Nov. 30, 2005),9 pages.
Ayers, Danny et al., "Beginning RSS and Atom Programming", Wiley Publishing, Inc.,(2005),pp. 1-54.
Benzinger, Brian "Google Reader Reviewed", Retrieved from:. <http://www.solutionwatch.com/250/google-reader-reviewed> on Jun. 17, 2009, (Oct. 7, 2005),5 pages.
Blair, Eric "Review: NetNewsWire 2.0", Retrieved from: <http://www.atpm.com/11.06/netnewswire.shtml> on Nov. 11, 2008, (Jun. 2, 2005),12 pages.
Daily, Geoff "Aggregating the Aggregators: RSS Reader Round-Up", Econtent, Online, Inc., vol. 28, No. 4,(Apr. 2005),6 pages.
De Sutter, Robbie et al., "Enhancing RSS Feeds: Eliminating Overhead through Binary Encoding", In Proceedings of ICITA 2005,(Jul. 3, 2005),6 pages.
Gill, Kathy E., "Blogging, RSS and the Information Landscape: A Look at Online News", *In Proceedings of WWW 2005*, (2005),7 pages.
Hammersley, Ben "Content Syndication with RSS", *Chapter 9: Using Feeds; Chapter 10: Directories, Web Aggregators, and Desktop Readers*, O' Reilly books,(Mar. 2003),24 pages.
Hammersley, Ben "Developing Feeds with RSS and Atom", *O'Reilly books*, O'Reilly Media, Inc.,(Apr. 2005),10 pages.
Hammond, Tony et al., "The Role of RSS in Science Publishing—Syndication and Annotation on the Web", D-Lib Magazine, vol. 10, No. 12,(Dec. 2004),15 pages.
Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentials area.pdf>,(Jul. 18, 2004),26 pages.
Huier, Zhang et al., "Design and Implementation of RSS-based Science and Technology Information Syndication System", *Library of Chinese Academy of Sciences*, (Jul. 2005),pp. 1-15.
Norihiko, Ike "Introduction to Podcasting Enjoyable by Personal Computers and Portable Music Players", Softbank Creative, vol. 11, No. 1,(Jan. 1, 2006),pp. 118-123.
VeriSign Inc., "Licensing VeriSign Certificates: Securing Multiple Web Server and Domain Configurations", *White Paper*, Available at <www.msctrustgate.com/pdf/licensing.pdf>,(Nov. 2, 2001),15 pages.
"Final Office Action", U.S. Appl. No. 11/158,911, (May 31, 2013), 14 pages.
"Non-Final Office Action", U.S. Appl. No. 12/234,403, (Jun. 6, 2013), 19 pages.
"Non-Final Office Action", U.S. Appl. No. 12/234,449, (Jun. 13, 2013), 9 pages.
"MX RSS Reader-Writer: Use RSS Feeds in Your Sites", InterAKT, Retrieved from http://www.interaktonline.com/Products/Dreamweaver•Extensions/MXRSSReader-WriterIOverviewI?from=!:j!:j rss on Jun. 21, 2005, 2 pages.
"FeedBurner: About Syndication, RSS, and Other Web-Altering Chemicals", Retrieved from: <http://www.feedburner.com/fb/a/aboutrss;jsessionid=96C24011924801 F8B3CAF4F12B66> on Jun. 21, 2005, 2 pages.

"Why Use Firefox", Retrieved from: http:I/www.mozilla.org/products/firefox, Jun. 17, 2005, 3 Pages.
"Mac OS X Server", Retrieved from http://www.apple.com/server/macosx/features/collaborationservices.html, 2005, 3 Pages.
"Welcome to Feed on Feeds, Your Server Side Personal RSS (and Atom!) Aggregator", Retrieved from http://feedonfeeds.com/ on Jun. 21, 2005, 4 pages.
"What is Reptile?", Retrieved from http://reptile.openprivacy.org/overview.html on Jun. 21, 2005, 2001, 4 pages.
"iSpeak It: Web Feeds and Podcasts", Retrieved from http://www.zapptek.com/ispeak-iU webpage.html on Jun. 21, 2005, Zapp Tek, 2002, 4 pages.
"Project: RSS Viewer: Summary", SourceForge, 2005, Retrieved from http://sourceforge.net/projects/rssview/ on Jun. 21, 2005, 2005, 4 pages.
"Latest Headline Viewer News and Information", Version: 0.9.9, Mar. 2, 2005, printed from website: http:// www.headlineviewer.com/newslindex.shtml on Jun. 21, 2005, Mar. 2, 2005, 4 pages.
Andersen, et al.,' "Changes to Functionality in Microsoft Windows XP", Retrieved from http://www.microsoft.com/techneUprodtechnol/ winxppro/maintain /sp2brows.mspx on Jul. 7, 2005, Aug. 9, 2004, 58 pages.
Apple, "Safari RSS: Your Desktop is the New Doorstep", Retrieved from http://www.apple.com/macosx/features/safari/ on Jun. 21, 2005, 2005, 4 pages.
Chien, et al.,' "Efficient Management of Multiversion Documents by Object Referencing", Proceedings of the 27th VLDB Conference,2001, pp. 291-300.
Ciancarini, et al.,' "Managing Complex Documents Over the WWW: A Case Study for XML", Transactions on Knowledge and Data Engineering, vol. 11, No. 4, Available at <http://citeseerx.ist.psu.edu/viewdoc/download?doi=10.1.1.18.1679&rep=rep1&type=pdf>,Jul. 1999, pp. 629-638.
Google, "Google Search Appliance Feeds Protocol Developer's Guide", Retrieved from http://code.google.com/gsa_apis/feedsguide.html on Jun. 21, 2005, Jun. 2, 2005, 11 pages.
Han, et al.,' "Websplitter: A Unified XML Framework for Multi-Device Collaborative Web Browsing", ACM Conference on Computer Supported Cooperative Work, 2000, 10 pages.
Hardy, et al.,' "Mapping and Displaying Structural Transformations Between XML and PDF", Proceedings of the 2002 ACM symposium on Document engineering, Electronic Publishing Research Group, School of Computer Science & IT, University of Nottingham, UK,Nov. 2002, pp. 95-102.
Kutay, et al.,' "Methods and Systems for Accessing, Organizing, Presenting and Viewing Data", U.S. Appl. No. 60/209,713, Kutay et al., filed Jun. 5, 2000, 345 pages.
Microsoft, "Increase Your Browsing and E-Mail Safety", Retrieved from http://www.microsoft.com/security/incidenUsettings.mspx on Jul. 7, 2005, Oct. 3, 2003, 4 pages.
Munsch "Dreams of a Rarebit Fiend", Retrieved from http://www.johnmunsch.com/projects/HotSheeU on Jun. 21, 2005, 6 pages.
Tetrault, "Review: Anonymizer Ultimate Security Suite", Retrieved from http://www.atpm.com/81.09/anonymizer.shtml on Jul. 7, 2005, ATPM, Sep. 2002, 12 pages.
"Non-Final Office Action", U.S. Appl. No. 12/234,403, Jan. 2, 2014, 5 pages.
"Notice of Allowance", U.S. Appl. No. 12/234,449, Jan. 6, 2014, 7 pages.
"Foreign Office Action", Mexican Application No. MX/a/2008/011058, Jul. 12, 2013, 9 Pages.
"Foreign Office Action", EP Application No. 07750552.7, (Oct. 11, 2013), 5 Pages.
"Foreign Office Action", CA Application No. 2,612,757, (Aug. 21, 2013), 3 pages.
"Non-Final Office Action", U.S. Appl. No. 11/158,911, (Sep. 12, 2013),13 pages.
"Notice of Allowance", U.S. Appl. No. 11/158,936, (Sep. 25, 2013), 6 pages.
"Supplemental Notice of Allowance", U.S. Appl. No. 12/234,449, Apr. 28, 2014, 2 pages.
"Notice of Allowance", U.S. Appl. No. 12/234,403, Apr. 25, 2014, 6 pages.

RSS DATA-PROCESSING OBJECT

RELATED APPLICATION

This application is a continuation of and claims priority under 35 U.S.C. §120 to U.S. patent application Ser. No. 11/276,536, filed on Mar. 3, 2006, the disclosure of which is incorporated by reference herein in its entirety.

BACKGROUND

RSS, which stands for Really Simple Syndication, is one type of web content syndication format. RSS web feeds have become more and more popular on the web and numerous software applications with RSS support are being developed. Typically, when web pages and other applications want to consume RSS data, the web pages or applications use some type of script, such as Javascript, to parse through the RSS feed and provide the data. What makes this scenario particularly challenging is that RSS comes in a variety of versions and different formats, e.g. RSS 0.91, 0.92, 1.0, 2.0 and Atom. This makes developing script or code for RSS parsing non-trivial and error prone.

SUMMARY

Various embodiments utilize a special object referred to as an rsshttp object to acquire an RSS feed, process the feed and expose an object model to a web page or application. The rsshttp object can parse through the feed's associated RSS data, normalize the feed data to a standard format, e.g. RSS 2.0, sanitize the feed data if necessary, and then present a standardized object model for interaction with web pages and applications. In at least some embodiments, the rsshttp object can be configured to work on an ad hoc basis, as by fetching and processing feeds when requested by the user, or on a scheduled basis in which feeds are fetched and processed on a scheduled basis. By using the object model, web pages and applications can access and meaningfully use associated feed data without having to understand the intricacies of the different feed formats.

DETAILED DESCRIPTION

Overview

Various embodiments utilize a special object to process RSS data. In this document, this special object is referred to as an rsshttp object and is configured to acquire an RSS feed, process the feed and expose an object model to a web page or application. It is to be appreciated and understood that while this object is referred to as an "rsshttp" object, such should not be construed to limit the object to applications only in connection with http. In one embodiment, the object can be implemented as a COM object.

The rsshttp object can parse through the feed's associated RSS data, normalize the feed data to a standard format, e.g. RSS 2.0, sanitize the feed data if necessary, and then present a standardized object model for interaction with web pages and applications. In at least some embodiments, the rsshttp object can be configured to work on an ad hoc basis, as by fetching and processing feeds when requested by the user, or on a scheduled basis in which feeds are fetched and processed on a scheduled basis. By using the object model, web pages and applications can access and meaningfully use associated feed data without having to understand the intricacies of the different feed formats, such as the XML that describes the feed data. Of course, web pages and applications that wish to interact with the RSS data outside of the object model can do so if they so choose.

Exemplary System Overview

Figure 1:
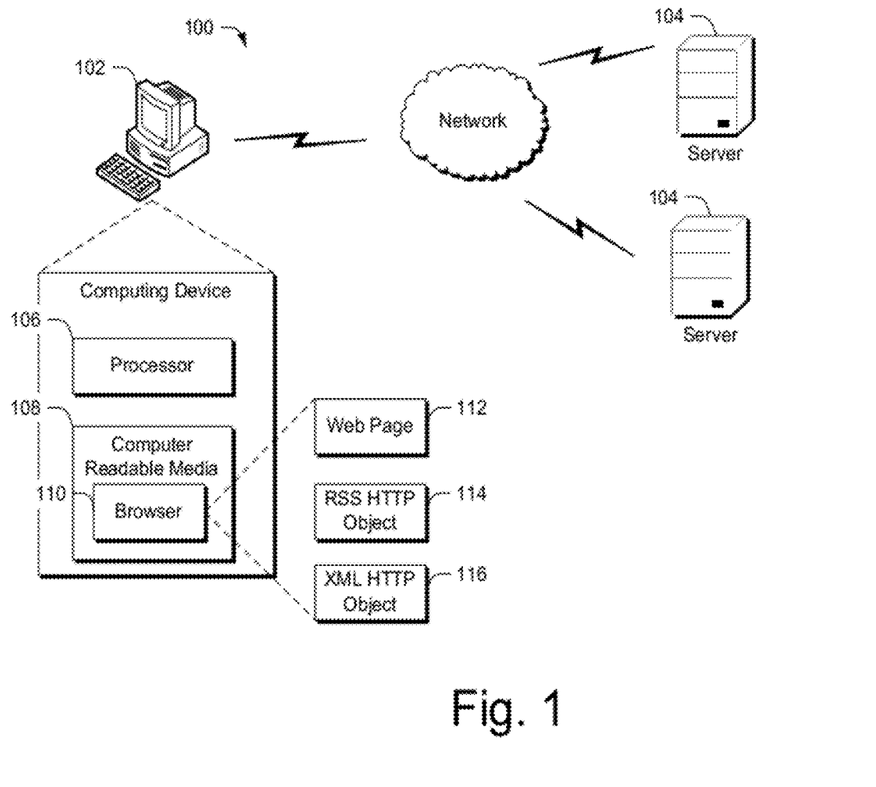
FIG. 1 illustrates an exemplary system in which the inventive techniques can be employed in one embodiment.

FIG. 1 illustrates an exemplary system, generally at 100, in which the inventive techniques can be employed in one embodiment. Here, system 100 includes one or more computing devices in the form of a client computing device 102 and one or more servers 104 that communicate with one another via a network such as the Internet. In this example, client computing device comprises one or more processors 106 and one or more computer-readable media 108 on which executable, computer-readable instructions reside. In this example, computer-readable media 108 includes code that implements a web browser 110.

In this example, the web browser 110 is configured to display one or more web pages 112 individual ones of which can support or contain Javascript, DHTML and the like. In addition, in at least some embodiments, browser 110 can comprise or otherwise make use of one or more rsshttp objects 114 and, optionally, one or more xmlhttp objects 116.

In this example, the rsshttp object is utilized to acquire RSS feeds, such as feeds that are required on an adhoc basis or feeds that are subscribed to by a user. In at least some embodiments, the rsshttp object can utilize xmlhttp object 116 as a means to acquire the feeds using known xml/http techniques.

When the rsshttp object acquires an RSS feed from, for example, servers 104, it can operate on the feed to perform a number of functions that permit applications and script to interact with the RSS data, without having to know anything about the underlying RSS format or the XML that describes the RSS data. More specifically, and as will be described in greater detail below, the rsshttp object processes the RSS feed to build an object model that is then exposed to applications and web pages.

As but one specific example of an rsshttp object, consider the section just below.

Exemplary RSSHTTP Object

Figure 2:
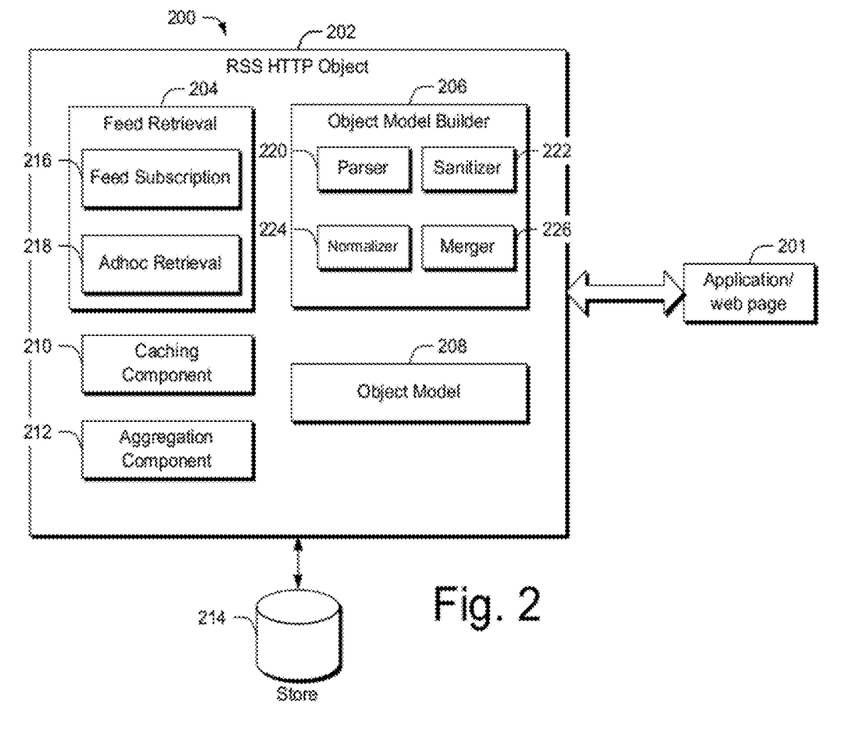
FIG. 2 illustrates a system in accordance with one embodiment.

FIG. 2 illustrates a system, generally at 200, in accordance with one embodiment. Here, system 200 includes one or more applications/web pages 201, one or more rsshttp objects 202 and a store 214.

In one embodiment, rsshttp object 202 includes functionality or components that include a feed retrieval component 204, an object model builder 206, an object model 208, a caching component 210 and an aggregation component 212.

In one embodiment, feed retrieval component 204 includes a feed subscription component 216 and an adhoc retrieval component 218. The feed retrieval component 204 is configured to enable feeds to be acquired and processed by the rsshttp object.

In this particular example, feed subscription component 216 enables a user to subscribe to a particular RSS feed. This can typically be done by a user, web site or application specifying a URL associated with the feed. Once the URL is specified, the subscription component 216 can subscribe to the feed and ensure that the most up-to-date information associated with that feed is available for consumption by the user. It can do this by regularly checking the RSS feed for new information on a scheduled basis. The schedule can be one that the rsshttp object sets, or one that is negotiated with an entity, such as a server, that provides the RSS feed.

In addition to feed subscription component 216, feed retrieval component 204 also includes, in this example, an adhoc retrieval component 218. In this embodiment, adhoc retrieval component 218 is operable to acquire RSS feeds on an adhoc basis. For example, if a user sees a feed that is of particular interest, they may click on an associated link at which time adhoc retrieval component 218 can take steps to acquire the feed specified by the user.

In one embodiment, object model builder 206 includes a parser component 220, a sanitizer component 222, a normalizer component 224 and a merger component 226.

In this particular example, parser component 220 is configured to parse the XML associated with RSS feeds that are acquired. Any suitable parsing component can be utilized, as will be appreciated by the skilled artisan. When the parser component operates on a feed, it parses through the XML elements identifying the particular elements that comprise the feed. Recall that RSS feeds can have many different formats. Accordingly, the parser is able to identify all of the different elements that comprise the feed. Note also that some of these elements may be elements that have been used to extend a feed's basic schema.

In this particular example, sanitizer component 222 is configured to sanitize the feed of any undesirable features or characteristics that the feed may have. For example, a feed may contain certain active or executable content that is undesirable to have. In this case, sanitizer component 222 sanitizes or removes the active or executable content.

Normalizer component 224 operates on the RSS data to normalize it to a standard or common format. In this example, the common or standard format is RSS 2.0. Accordingly, those other formats that vary from the RSS 2.0 format are operated upon to remove or map elements to the RSS 2.0 elements. As such, having the RSS data in a standardized format leads to predictability in handling and processing.

In this example, merger component 226 processes the RSS data and does such things as register and store new content in data store 214, along with other relevant state data. This can enable the object model to provide or fire events to entities that register for them. For example, an application may register for a notification when new content is received from a particular feed. In this instance, the merger component can look for any such new content so that object 202 can fire an event to the application.

The output of the object model builder 206, in at least some embodiments, is a normalized, sanitized object model 208 that can be exposed to application/web page 201. These entities can interact with the object model in lieu of the XML that defines the RSS feed thus alleviating the entities from having to understand the intricacies of the different RSS feeds. Of course, for those entities that wish to interact directly with the XML, they are free to do so. An exemplary object model is described below under the heading "Object Model".

In one embodiment, caching component 210 is configured to perform caching duties that are designed to reduce the load that is experienced by servers that provide the RSS feeds. More specifically, the caching component can be configured to utilize conditional GET requests so that a request is not made unless it is necessary. For example, when requesting the feed data, the rsshttp object can send a timestamp of the last time it received data for the feed to the server. The server can then respond with new data or quick respond with "no new data". In addition, the caching component can be configured to ensure that requests are small so that the cache can be quickly updated.

In one embodiment, aggregation component 212 is configured to aggregate content. That is, typically RSS feeds provide only the most recent items. Yet, there are instances when having a complete set of items is desirable. Aggregation component 212 is configured to acquire these different and sometimes dated items and aggregate the items in data store 214 so that an application or web page can access all of the items.

Object Model

Figure 3:
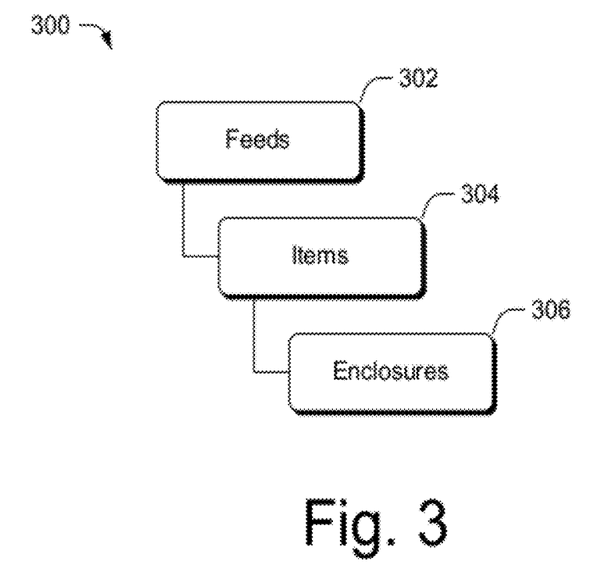
FIG. 3 illustrates individual objects of an object model in accordance with one embodiment.

FIG. 3 illustrates individual objects of an object model 300 in accordance with one embodiment. The object model about to be described constitutes but one example of an object model that can be utilized and is not intended to limit application of the claimed subject matter to only the object model that is described below. In at least some embodiments, the object model is exposed by an API that is callable by an application or web page.

In this particular object model, a top level object feeds 302 is of the type feed. Underneath the feeds object 302 is an item object 304 of the type item, and underneath the item object 304 is an enclosure object 306 of the type object.

The individual objects of the object model have properties, methods and, in some instances, events that can be utilized to manage received web content. The above-described object model permits a hierarchical structure to be utilized to manage and interact with feeds without necessarily having to be knowledgeable of the underlying XML that describes the RSS feed.

Considering the object model further, consider item and enclosure objects 304, 306 respectively. Here, these objects very much reflect how RSS is structured itself. That is, each RSS feed has individual items inside of which can optionally appear an enclosure. Thus, the structure of the object model is configured to reflect the structure of the syndication format.

From an object model perspective, there are basically two different types of methods and properties on an item. A first type of method/property pertains to data which is read only, and a second type of method/property pertains to data which can be both read and written.

As an example of the first type of method property, consider the following. Each feed can have data associated with it that is represented in an XML structure. This data includes such things as the title, author, language and the like. Data such as this is treated by the object model as read only. This prevents applications from manipulating this data.

On the other hand, there is data that is treated as read/write data, such as the name of a particular feed. That is, the user may wish to personalize a particular feed for their particular user interface. In this case, the object model has properties that are read/write. For example, a user may wish to change the name of a feed from "New York Times" to "NYT". In this situation, the name property may be readable and writable. The object model can also be extensible with "expando" properties which allow an application to add data/state to the feed dynamically. One example of this is storing foreign keys along side the rss items for easy matching of items with data in another database/store.

Figure 4:
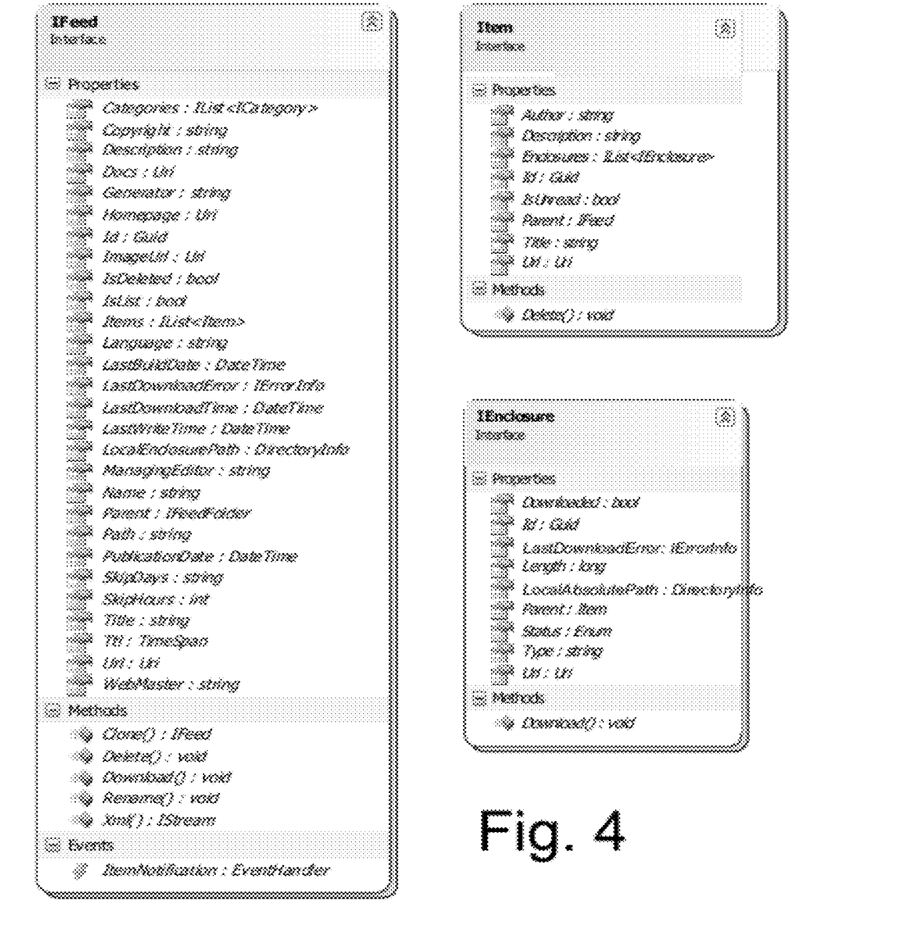
FIG. 4 illustrates individual objects of an object model in accordance with one embodiment.

FIG. 4 illustrates a top level object or interface IFeed, along with objects or interfaces IItem and IEnclosure objects, along with their properties and methods in accordance with one embodiment. Other objects, interfaces, methods and properties can be utilized without departing from the spirit and scope of the claimed subject matter.

Starting first with the IFeed object, consider the following. Many of the properties associated with this object come from the RSS feed itself, e.g., Title, URL, Webmaster, SkipHours, SkipDays, ManagingEditor, Homepage, ImageURL and the like, as will be appreciated by the skilled artisan. In addition, there is another set of properties of interest, i.e. the Items property which is a collection that has all of the items that are part of a feed and the LocalEnclosurePath property which provides the actual directory to which all of the enclosures are written. Thus, for an application, the latter property makes it very easy to access the enclosures.

In addition, this object supports a small set of methods such as Download( ) which are used to manage particular feeds. Further, this object supports a method XML( ) which returns a feed's XML in a standard format. The XML data can be used for such things as creating a newspaper view of a feed.

Moving to the Item object, this object has a set of properties that represent regular RSS elements, e.g. Description, URL, Title, Author and the like. In addition, there is a Parent property that points back to the associated actual feed, and an Id property so that an application can identify items versus having to iterate over all items. In addition, there is an Enclosures property which is the collection of the item's enclosures of the type IEnclosure. Further, an IsRead property enables an application to indicate whether a particular item has been read.

Moving to the Enclosure object, consider the following. This object has properties that include a Type property (e.g. mp3) and Length property that describes the length of a particular enclosure for example in bytes. There is also the LocalAbsolutePath to a particular enclosure. The Download( )method allows individual enclosures to be downloaded and used by applications.

By exposing the object model described above to applications and web pages, the applications and web pages can interact with the objects and hence data of the feed, without having to be knowledgeable of or deal with any of the underlying XML that describes the feed. Of course, applications and web pages that wish to deal with the underlying XML are still free to do so.

Exemplary Methods

Figure 5:
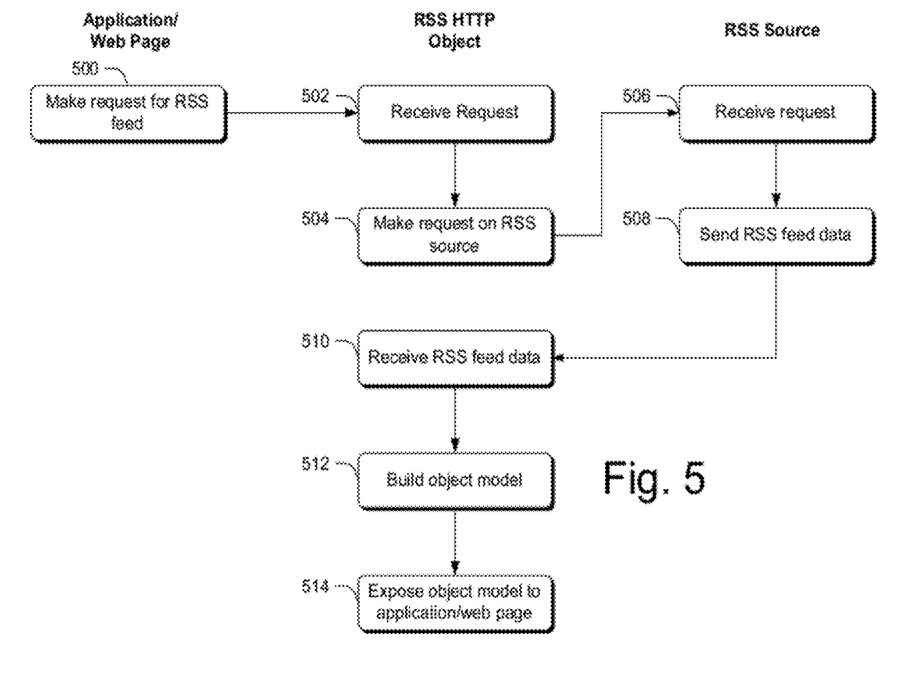
FIGS. 5-7 are flow diagrams that describe steps in methods in accordance with one embodiment.
Figure 6:
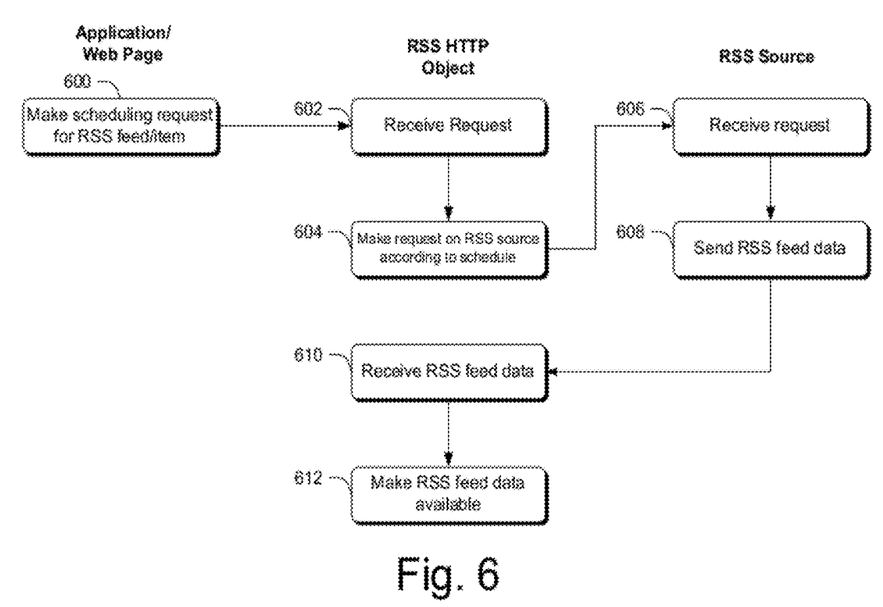
Figure 7:
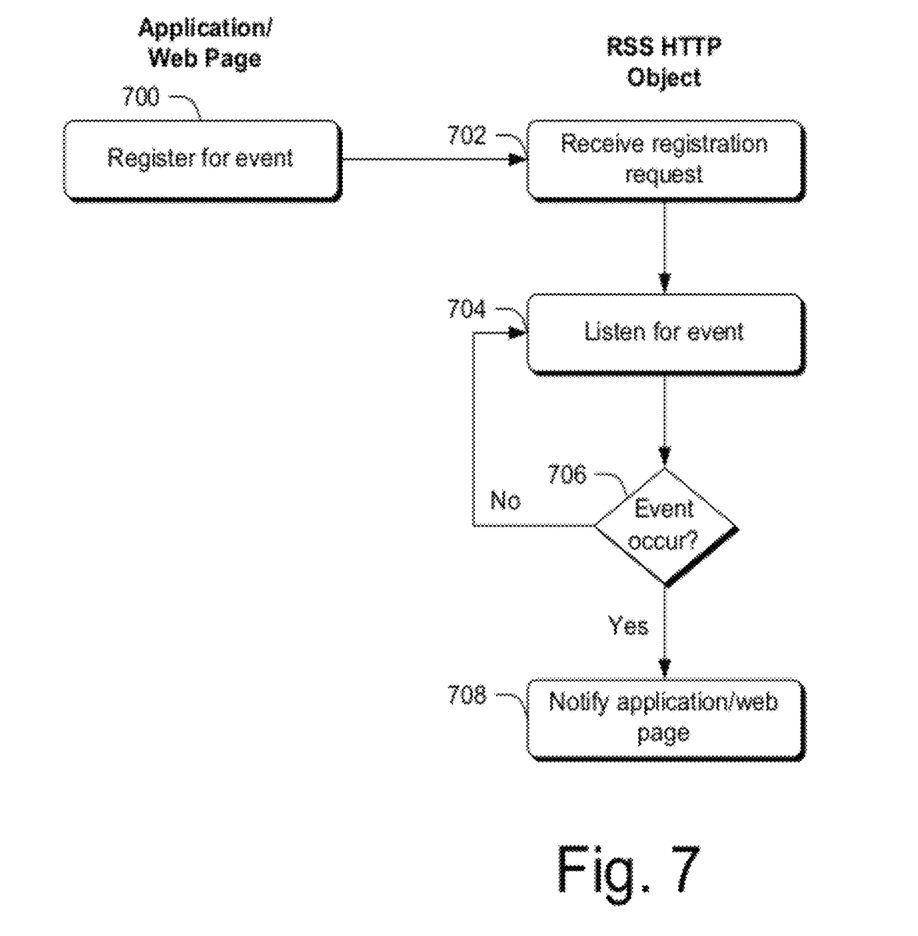

FIGS. 5-7 are flow diagrams that illustrate steps in a method in accordance with one embodiment. The method can be implemented in connection with any suitable hardware, software, firmware or combination thereof. In at least some embodiments, the methods can be implemented in connection with systems such as those shown and described above and below. It is to be appreciated and understood that systems different from the ones described in this document can be utilized to implement the described methods without departing from the spirit and scope of the claimed subject matter.

In the illustrated methods, the flow diagrams are organized to illustrate which entities can perform the various acts. Accordingly, those acts that can be performed by an application or web page are designated as such. Similarly, those acts that can be performed by an rsshttp object or RSS source (server) are designated as such.

FIG. 5 illustrates an exemplary method for building an object model in accordance with one embodiment.

At step 500, an application or web page makes a request on the rsshttp object for an RSS feed. This request can be made via a call to a suitably exposed application program interface and can constitute any suitable type of request, such as an adhoc request, subscription request and the like.

The rsshttp object receives the request at 502 and makes a corresponding request, at 504, on an associated RSS source such as a server. The server receives the request at 506 and provides or sends RSS feed data to the rsshttp object at 508.

The rsshttp object then normalizes, sanitizes and merges the data into the store if it's not an ad-hoc feed.

The rsshttp object receives the RSS feed data at 510 and builds an object model at 512. Examples of how an object model as well as a specific instance of an object model are provided above. Once the object model is built, the rsshttp object exposes the object model to the application/web page at 514.

Once the object model is exposed, an application/web page can interact with and consume the RSS data. This can be done by making calls to various methods exposed by the object model. In this manner, an application or web page does not need to be concerned with the underlying XML that describes the feed. This is because the XML was abstracted away when the object model was built. In addition to the object model, in at least some embodiments, various error messages can be generated for the application or web page in the event of an error. Errors can include, for example, failed download, failed to normalize, failed to sanitize, invalid feed format and the like. Further, various statuses can be updated or saved in a suitable data store. For example, statuses associated with items such as "not updated", "new", "updated" and "removed" can be recorded.

FIG. 6 illustrates an exemplary method for making scheduling requests in accordance with one embodiment.

At step 600, an application or web page makes a scheduling request on the rsshttp object. This request can be made via a call to a suitably exposed application program interface. In this example, an application or web page may wish to periodically receive feed updates. Thus, according to a schedule provided by the application or web page, or negotiated with the server, regular checks can be made. In at least some embodiments, the application or web page does not make the request every time. It simply sets up the request/schedule initially, then the rsshttp object will automatically, in the background, make the requests.

The rsshttp object thus receives the request at 602 and makes a corresponding request, at 604, on an associated RSS source such as a server, according to the schedule. The server receives the request at 606 and provides or sends RSS feed data to the rsshttp object at 608 if there is any data that meets the request.

The rsshttp object receives the RSS feed data at 610 and makes the RSS feed data available at 612. This step can be performed in a number of ways. For example, when new feed data is received responsive to the request, an event can be fired and the user can be notified. Notification can take place in any suitable way. For example, a user interface element in the user's browser may be activated to indicate that a new item has been received. Alternately or additionally, a notification can be sent to the user, such as an email or instant message, popup window or application/web page UI can update itself with the new item.

FIG. 7 illustrates an exemplary method for registering for events in accordance with one embodiment.

At step 700, an application or web page registers for an event with the rsshttp object. Any suitable event or type of event can be the subject of registration. For example, an application or web page may be interested in receiving notifications when new feed items are added or feed items are changed, deleted or read.

The rsshttp object receives the registration request at 702 and listens for the particular event at 704. This step can be implemented in any suitable way. For example, the rsshttp object may poll the RSS source or server at regular intervals to ascertain whether a particular event has occurred. Alternately or additionally, an RSS source or server may notify subscribers when certain events occur.

If an event occurs at step 706, the rsshttp object notifies the application or web page at step 708. Any suitable notification can be provided examples of which are described above. If an event does not occur, then step 706 returns to step 704 and listens for the event of interest.

Exemplary Implementation

Figure 8:
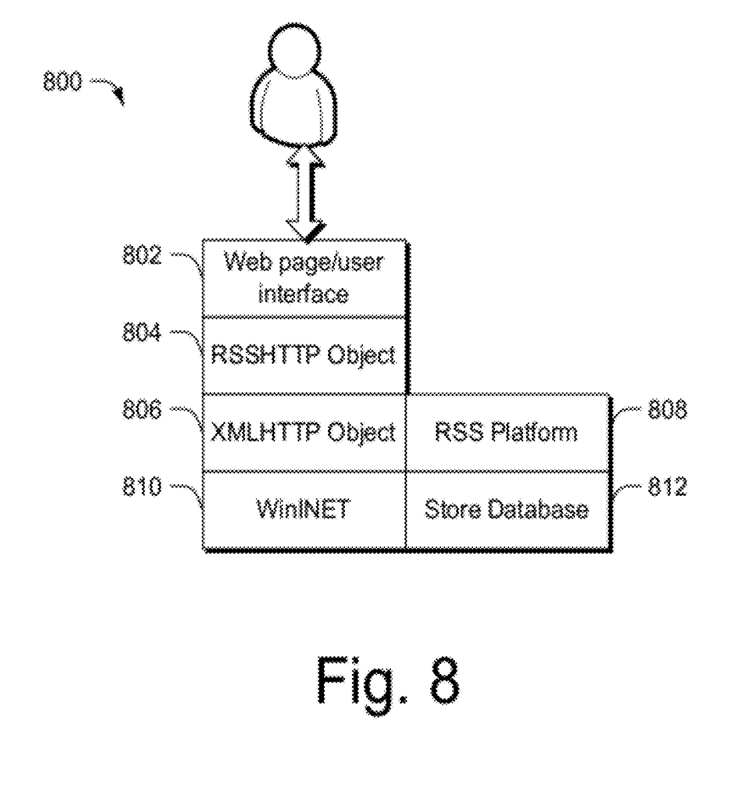
FIG. 8 illustrates one exemplary specific implementation or system in accordance with one embodiment.

FIG. 8 illustrates one exemplary specific implementation or system in accordance with one embodiment generally at 800. It is to be appreciated and understood that the example about to be described constitutes but one example of how one can implement the above-described functionality. As such, other different implementations can be utilized without departing from the spirit and scope of the claimed subject matter.

In this example, a web page/user interface 802 allows a user to interact with the system. This interface can be provided by any suitable application. For example, in some embodiments, a browser interface can be used. System 800 also includes an rsshttp object 804, an optional xmlhttp object 806, an optional RSS platform component 808, a WinINET component 810 and a store database 812.

Here, rsshttp object 804 can use xmlhttp object 806 to access XML data in a manner which will be understood by the skilled artisan. Additionally, in this particular implementation, these objects can leverage an RSS platform 808 to acquire RSS feed data. An exemplary platform is described in U.S. patent application Ser. No. 11/158,398, filed on Jun. 21, 2005.

WinINET component 810 is utilized to make the network requests, as will be appreciated by the skilled artisan, and store database 812 is used to store all of the individual items and state information.

A typical operation utilizing this implementation example will occur as follows. In some instances, a piece of jscript code executing as part of an application will instantiate rsshttp object 804. The jscript code can then make a request on the rsshttp object using an URL associated with a particular RSS feed. The rsshttp object 804 can then make a request on the server. If xmlhttp object 806 and/or RSS platform are present, the rsshttp object can leverage these components to acquire the RSS feed data.

The server then gives back the RSS feed data to the rsshttp object 804. Now, the rsshttp object can do things such as sanitize the data, normalize the data, and merge the data in store database 812. This can include, by way of example and not limitation, updating state information associated with the RSS data. Once this is done, the rsshttp object can build an object model and expose the object model to the application or web page. In this example, store database 812 stores not only the state of individual feed items, but various subscription lists as well. This allows the rsshttp object to keep feed items fresh even when an application or web page 802 is not loaded.

For example, a web application can, per domain (URL domain), subscribe to N number of feeds. This allows a web application to always have up-to-date data when it is launched.

Security

In at least some embodiments, the rsshttp object enforces a per domain RSS feed security model which means that a web page from a specific domain can only access a subset of the user's feed subscription for which it has received permission from the user. This makes it possible, for example, for a user to allow access to his family picture feed subscription to a new slideshow web page that displays images in a new and engaging way, while at the same time limit the access of this page to a feed of the user's recent credit card transactions.

Conclusion

Various embodiments utilize a special object referred to as an rsshttp object to acquire an RSS feed, process the feed and expose an object model to a web page or application. The rsshttp object can parse through the feed's associated RSS data, normalize the feed data to a standard format, e.g. RSS 2.0, sanitize the feed data if necessary, and then present a standardized object model for interaction with web pages and applications. In at least some embodiments, the rsshttp object can be configured to work on an ad hoc basis, as by fetching and processing feeds when requested by the user, or on a scheduled basis in which feeds are fetched and processed on a scheduled basis. By using the object model, web pages and applications can access and meaningfully use associated feed data without having to understand the intricacies of the different feed formats.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable memories implemented at least partially by hardware and storing executable instructions that, when executed by a client device, cause the client device to perform operations including:
   receiving, using an rsshttp object at the client device, a request for a Really Simple Syndication (RSS) feed;
   requesting from an associated RSS source feed data associated with the RSS feed by the rsshttp object utilizing an xmlhttp object to access Extensible Markup Language (XML) data associated with the RSS feed;
   in response to the requesting, obtaining by the rsshttp object at the client computer XML elements from the XML data associated with the RSS feed;
   building a normalized object model at the client computer to normalize a format of the feed data to a standard feed format; and
   exposing the normalized object model via an interface to entities that consume RSS data to enable the entities to interact with the feed data without having to understand the XML data that describes the RSS feed.

2. The one or more computer-readable memories as recited in claim 1, further comprising instructions that, when executed by the client device, cause the client device to perform operations including storing one or more foreign keys alongside particular items of the RSS feed to allow the particular items of the RSS feed to be matched to data in a remote database.

3. The one or more computer-readable memories as recited in claim 2, wherein the exposing of the normalized object model is effective to cause the foreign keys to be available to the applications or web pages.

4. The one or more computer-readable memories as recited in claim 1, wherein the entities include at least applications and webpages configured to consume RSS data via the interface.

5. The one or more computer-readable memories as recited in claim 1, further comprising instructions that, when executed by the client device, cause the client device to perform operations including parsing, using the rsshttp object, the XML elements from the XML data associated with the RSS feed.

6. The one or more computer-readable memories as recited in claim 1, further comprising instructions that, when executed by the client device, cause the client device to perform operations including:
receiving a scheduling request for the RSS feed or an item of the RSS feed; and
making one or more requests on the associated RSS source according to an associated schedule.

7. The one or more computer-readable memories as recited in claim 1, further comprising instructions that, when executed by the client device, cause the client device to perform operations including receiving registration requests, and listening for associated events.

8. The one or more computer-readable memories as recited in claim 1, further comprising instructions that, when executed by the client device, cause the client device to perform operations including:
receiving one or more registration requests;
listening for one or more associated events; and
generating a notification associated with an event that occurs.

9. The one or more computer-readable memories as recited in claim 1, wherein the instructions, when executed by the client device, cause the client device to implement a web browser to perform the operations.

10. The one or more computer-readable memories as recited in claim 1, wherein the normalized object model comprises one or more individual objects that have callable methods and properties associated with the RSS feed data, the one or more individual objects including a feeds object associated with the RSS feed, an items object associated with particular items of the RSS feed, and an enclosure object associated with particular enclosures of the RSS feed.

11. The one or more computer-readable memories as recited in claim 1, wherein the object model comprises a feeds object associated with the RSS feed, and items object associated with particular items of the RSS feed, and an enclosure object associated with particular enclosures of the RSS feed.

12. The one or more computer-readable memories as recited in claim 1, wherein the normalized object model is configured to fire events to entities that register for the events.

13. A method comprising:
receiving via a web browser implemented by a computing device a request for a Really Simple Syndication (RSS) feed;
in response to the request, interacting with an associated RSS source to acquire the RSS feed through an rsshttp object that is configured to utilize an xmlhttp object to acquire the RSS feed when the RSS feed uses Extensible Markup Language (XML) data; and
exposing a normalized object model that is configured to normalize feed data associated with the RSS feed to a standard feed format, the normalized object model being exposed to one or more entities to enable the one or more entities to interact with the feed data without having to understand the XML data that describes the RSS feed.

14. The method as recited in claim 13, wherein the rsshttp object is configured to fetch feeds on an ad hoc basis.

15. The method as recited in claim 13, wherein the rsshttp object is configured to enable a user to subscribe to the RSS feed.

16. A client device comprising:
a memory; and
a processor configured to utilize instructions in the memory to implement a web browser comprising an rsshttp object, the web browser configured to:
receive, using the rsshttp object, a request for a Really Simple Syndication (RSS) feed from a requestor; and
in response to the request, interact on behalf of the requestor with an associated RSS source to obtain corresponding data for the RSS feed by instantiating the rsshttp object to access Extensible Markup Language (XML) data associated with the RSS feed from the associated RSS source.

17. The client device as recited in claim 16, wherein the web browser is further configured to receive a scheduling request for the RSS feed or an item of the RSS feed and interact with the associated RSS source according to an associated schedule.

18. The client device as recited in claim 16, wherein the web browser is further configured to receive registration requests and listen for associated events.

19. The client device as recited in claim 16, wherein the RSS feed comprises RSS feed data, and wherein the web browser is further configured to build a normalized object model that is configured to normalize a format of the RSS feed data to a standard feed format.

20. The client device as recited in claim 19, wherein the web browser is further configured to expose the normalized object model to enable different types of entities including at least applications and web pages to interact with the RSS feed data without having to know information about the format of the RSS feed data and without having to understand the XML associated with the RSS feed.

* * * * *